(12) United States Patent
Dorsey et al.

(10) Patent No.: US 7,150,090 B2
(45) Date of Patent: Dec. 19, 2006

(54) METHOD FOR MATCHING A COLLECTOR TO REPLACE A BRUSHLESS EXCITER IN A TURBINE GENERATOR DRIVE TRAIN

(75) Inventors: David Norwood Dorsey, Clifton Park, NY (US); Klaus Werner Sommerlatte, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 161 days.

(21) Appl. No.: 10/892,229

(22) Filed: Jul. 16, 2004

(65) Prior Publication Data

US 2006/0012345 A1    Jan. 19, 2006

(51) Int. Cl.
*H02K 15/00* (2006.01)
*H02K 15/02* (2006.01)

(52) U.S. Cl. .......................................... 29/596; 29/598

(58) Field of Classification Search .................. 29/596, 29/598, 402, 402.01, 402.03, 402.08, 402.09, 29/402.11, 407.01, 407.05, 407.08, 407.09, 29/407.1, 401; 310/42
See application file for complete search history.

(56) References Cited

U.S. PATENT DOCUMENTS

| 5,093,597 A | 3/1992 | Hughes ....................... 310/180 |
| 6,285,089 B1 | 9/2001 | Nelson ......................... 322/10 |
| 6,483,218 B1 | 11/2002 | Petrinko ...................... 310/114 |
| 6,628,022 B1 | 9/2003 | Clayton et al. ................ 310/42 |

*Primary Examiner*—A. Dexter Tugbang
*Assistant Examiner*—Livius Radu Cazan
(74) *Attorney, Agent, or Firm*—Nixon & Vanderhye P.C.

(57) ABSTRACT

A method to replace a brushless exciter with a static excitation system for a generator including the steps of: measuring a plurality of dimensions of the brushless exciter; determining a rotational mass moment of inertia of a rotation portion of the excitation system design; forming a rotating static excitation system having substantially the same rotational mass moment of inertia as the brushless exciter; removing the brushless exciter from the generator, and attaching the static excitation system to the generator.

12 Claims, 5 Drawing Sheets

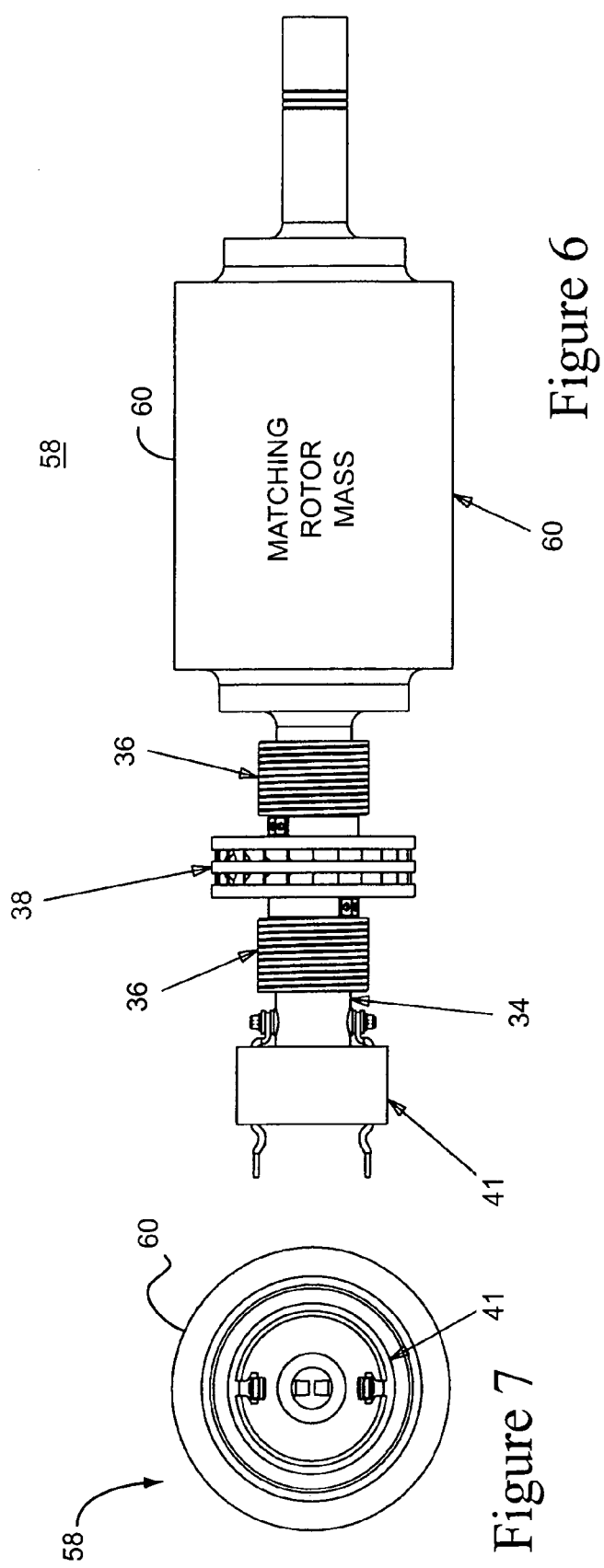

METHOD FOR MATCHING A COLLECTOR TO REPLACE A BRUSHLESS EXCITER IN A TURBINE GENERATOR DRIVE TRAIN

BACKGROUND OF THE INVENTION

This invention relates to electric generator field direct current (DC) exciters for industrial turbine-generator assemblies and, in particular, to techniques for replacing a brushless exciter (BE) with a static DC excitation system.

Many large industrial turbine generator systems, such as those generating more than 100 MegaWatts (>100 MW) use a brushless exciter as the power source for the DC current required for the electric generator electro-magnet field winding. This DC power source is commonly referred to as the generator excitation system or simply the "exciter".

The field windings of the generator are typically mounted on a rotor that is surrounded by a stator. The exciter is electrically connected to the field windings on the rotor. The DC current from the exciter in the rotor field windings forms a magnetic field around the rotor. A turbine rotationally drives the rotor. As the magnetic field from the rotor field windings rotates through the stator, voltage is induced in the stator windings. The current in the stator is output as power by the generator.

Brushless exciters have had a history of unexpected failures and expensive repairs. As they age, brushless exciters tend to fail more often and their failures become more severe. As the demand for electricity grows, the demands on the utility interconnection electrical grids are requiring generator excitation systems with faster dynamic characteristics and higher power. To address these issues, electric power producers often elect to replace their brushless excitation systems with a static excitation system.

Static excitation systems are well-known and proven technologies for providing DC current to a field windings of a generator rotor in larger generator turbine assembly. A static excitation system typically includes a DC power supply and a mechanical assembly (often referred to as a "collector") that connects to the rotor of the generator. It is known how to replace a brushless excitation system with a static excitation system.

To replace a brushless exciter, the collector of the static excitation system must be matched to the turbine generator rotor system. Matching the collector to the turbine generator rotor system includes designing the collector such that it has the same mechanical dynamic and vibration characteristics at the coupling to the generator rotor as did the brushless exciter. Typically, the engineer designing the collector has extensive information regarding the structure, mechanical dynamic characteristics and vibration characteristics of the turbine generator rotor system.

Situations do arise where the engineer designing the collector does not have extensive information regarding the turbine generator rotor system. Matching the mechanical, dynamic and vibration characteristics of the brushless exciter is problematic if detailed information on the structure and design of the turbine generator rotor system is not available. To determine the impact the smaller collector rotor will have on the rotor dynamic characteristics of the turbine generator rotor system that originally had a brushless exciter, detailed design information is required for the system which typically is only available to the original equipment manufacturer (OEM). Various ways exist to determine the rotor dynamic characteristics of the system but they are costly. For example, much of the needed mechanical information about the turbine generator rotor system may be obtained by disassembly, inspection and measurement of the components of the turbine generator rotor system. Disassembly of the turbine generator rotor system requires that the generator turbine assembly be taken off-line and stopped.

It is generally not economical to take off-line a turbine-generator system to measure and collect data on the turbine generator rotor system. There is a long felt need for a system and method to design a collector to replace a brushless exciter without detailed existing documentation describing the turbine generator rotor system and while the brushless exciter and its associated turbine-generator continue to operate and produce electrical power.

BRIEF DESCRIPTION OF THE INVENTION

The invention may be embodied as a method to replace a brushless exciter with a static excitation system for a generator comprising: measuring a plurality of dimensions of the brushless exciter; determining a rotational mass moment of inertia of a rotation portion of the excitation system design; forming a rotating static excitation system having substantially the same rotational mass moment of inertia as the brushless exciter; removing the brushless exciter from the generator, and attaching the static excitation system to the generator.

In addition, the invention may be embodied as a method to replace a brushless exciter with a static excitation system for a generator comprising: measuring a plurality of dimensions of the brushless exciter; determining a center of gravity for the brushless exciter based on the measured dimensions and determine weight; determining the rotational mass moment of inertia for the brushless exciter based on the center of gravity and weight; matching the rotational mass moment of inertia to a rotational mass moment of inertia of a static excitation system design; constructing the collector in accordance with the static excitation system design with matched rotational mass moment of inertia, and substituting the constructed collector for the brushless exciter.

The invention may also be embodied as a collector for a static excitation system for a generator comprising: a rotor shaft; a coupling adapted to connect to a generator and provide direct current (DC) to field windings of the generator, and a rotor mass coaxial with the rotor shaft and having a rotational mass moment of inertia configured such that a rotational mass moment of inertia of the collector is substantially the same as a rotational mass moment of inertia of a brushless exciter previously coupled to the generator.

BRIEF DESCRIPTION OF THE DRAWINGS

FIGS. 6 and 7 are side and end view, respectively, of a collector with a matching rotor mass.

DETAILED DESCRIPTION OF THE INVENTION

Figure 1:
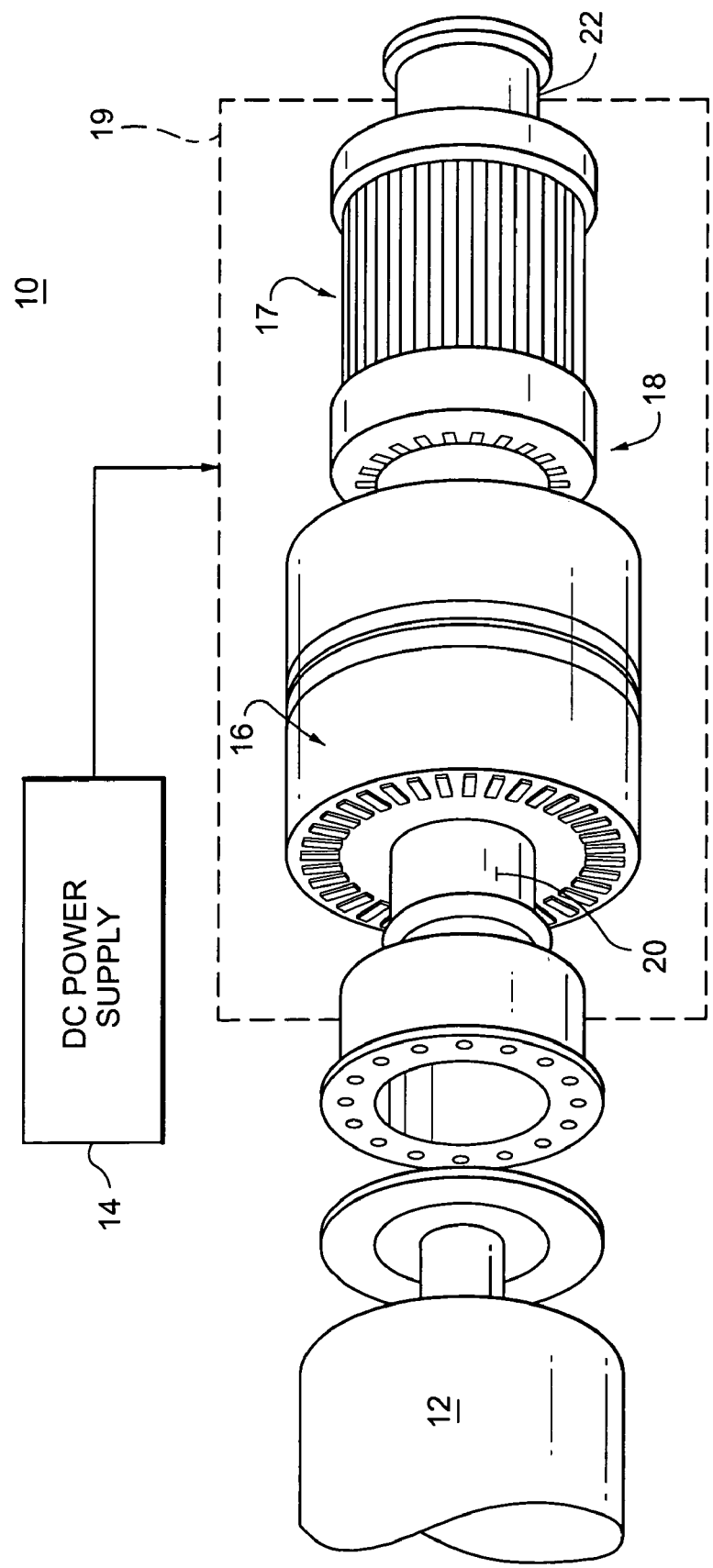
FIG. 1 is a side perspective view of a brushless exciter and rotor assembly.

FIG. 1 shows a conventional brushless exciter 10. The brushless exciter 10 provides direct current (DC) electrical power to the field windings of the generator rotor 12. The main components of the brushless exciter 10 are a pilot exciter, an ac exciter and a rectifier wheel. A brushless exciter excitation system 10 generally consists of two major components, a DC power supply 14 and a mechanical package 19 (attached to the turbine generator system). The power supply 14 provides DC current and the associated controls for the brushless exciter. The mechanical package 19 consists of a rotating assembly 18 and a stationary assembly (not shown) surrounding at least a portion of the rotating assembly 18.

The rotating assembly 18 typically consists of one or more of the following: a rotor shaft 20, a diode rectification system 16, an armature winding and core assembly 17, bearings 22, a ventilation fan, and a permanent magnet generator. The stationary assembly may be arranged in a housing around the rotating assembly 18 of the brushless exciter. The stationary assembly 16 typically comprise one or more of the following (not shown): a base assembly, a field winding and core assembly, a bearing assembly, baffles for directing cooling air, heat exchangers (if closed loop cooling system), and a protective enclosure (shown by dotted lines) covering the other stationary components and the rotating assembly 18.

A brushless exciter rotor assembly 18 typically is eight (8) feet or longer in length and weighs over 6000 pounds. In contrast a static collector is smaller and less massive, e.g., 2000 pounds. Because of these differences in size and mass, the BE rotor assembly 18 has different rotor dynamics and affects the total turbine generator rotor system dynamics in a different manner than does a static collector. In particular, when a shorter and lighter collector shaft is coupled to the generator rotor drive of a turbine generator that originally had a BE, the rotor dynamic and vibrational characteristics of the system can be substantially changed due to the substitution of a collector for a BE. Depending on the system, this change in excitation rotors can have a negative impact on the operation of the total generator-turbine system.

Figures 2, 3:
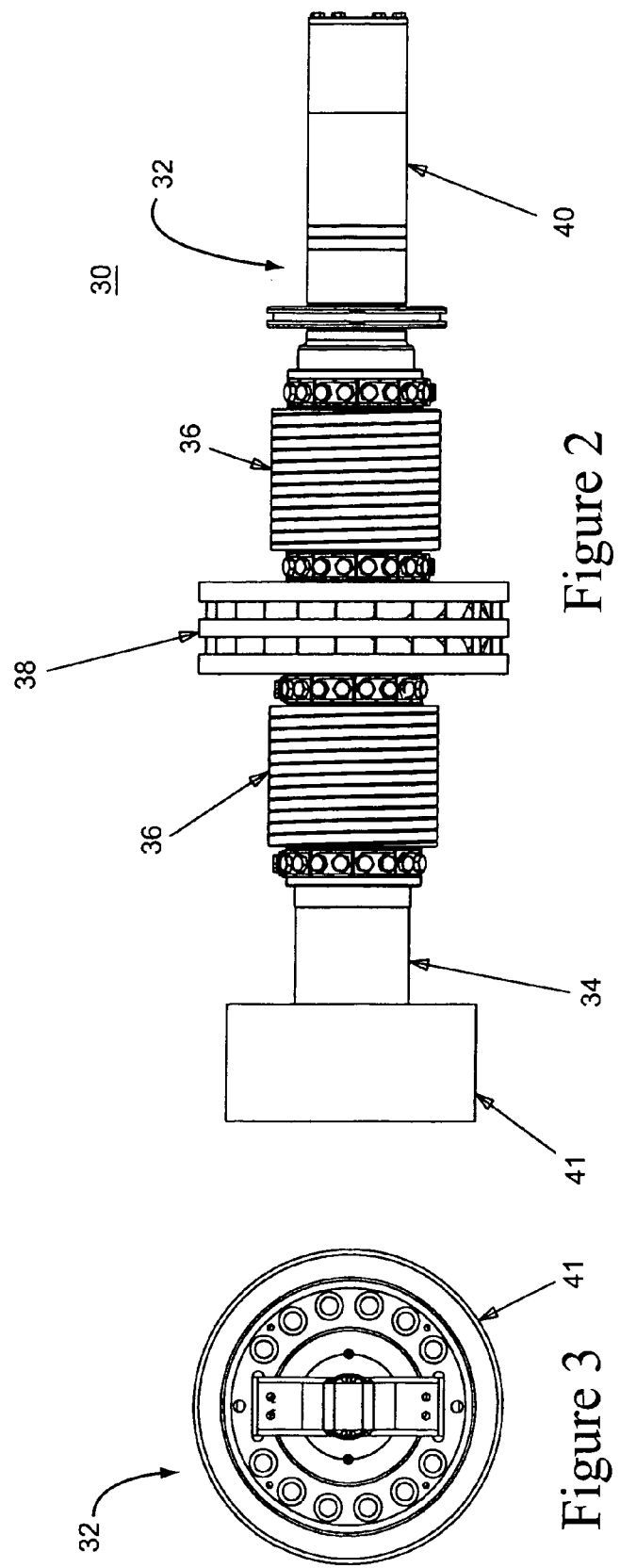
FIGS. 2 and 3 are side and end views, respectively, of a standard collector.

FIGS. 2 and 3 are side and front views of a conventional static excitation system 30, e.g., a collector. The system consists of two major components, a DC power supply (not shown) and a mechanical package commonly referred to in industry as "a collector" which is attached to the generator rotor of a turbine generator system. The power supply provides DC current and the associated controls for the collector 30. The mechanical package of the collector consists of a rotor assembly 32 and a stationary assembly (not shown). The rotor assembly 32 typically comprises one or more of the following: a rotor shaft 34, two slip rings 36, a ventilation fan 38 and bearings 40. A rotating coupling 41 connects the generator rotor to the collector. The stationary assembly provides a housing and support for the rotating assembly. The stationary assembly includes electrical connectors that are in contact with the slip rings to convey DC electrical power from the stationary power supply to the rotating assembly of the collector.

A collector rotor assembly 30 is typically less than eight (8) feet in length, and weighs less than 6000 pounds. The stationary assembly typically consists of one or more of the following: a base assembly, a brush rigging assembly, a bearing assembly, baffles for directing cooling air, and a protective enclosure (covering stationary and rotating assemblies).

Figure 4:
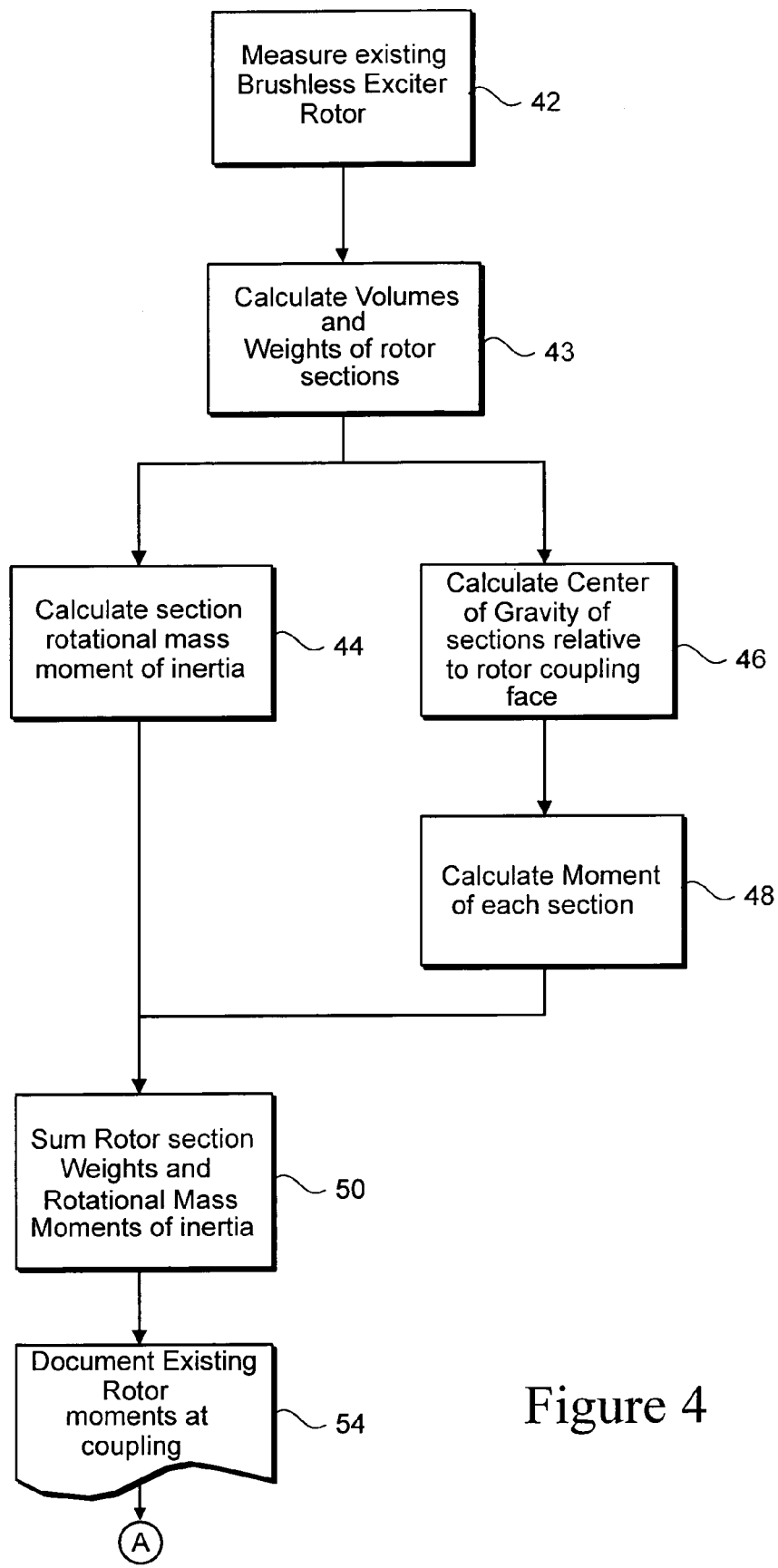
FIGS. 4 and 5 are a flow chart of method steps to replace the brushless exciter with a collector.
Figure 5:
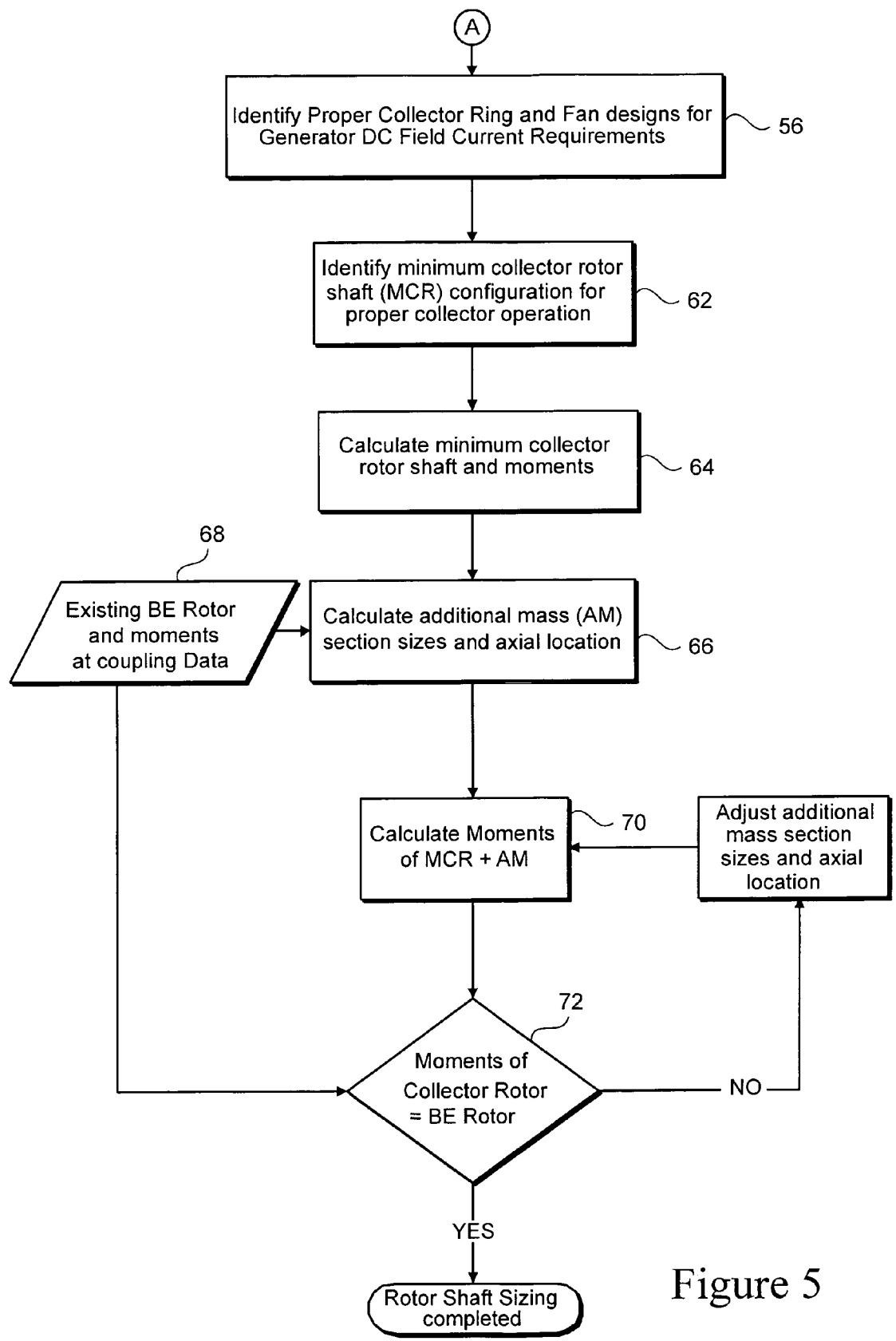

FIGS. 4 and 5 are a flow chart for when the details of the turbine generator system are not known and this assembly will be treated as a "black box" for analysis purposes. In step 42, the dimensions of an existing brushless exciter are measured. The size and shape of the brushless exciter rotor can be obtained by taking field measurements of the exciter. These field measurements may be made while the brushless exciter is connected to the generator rotor or disassembled from the generator rotor.

As is shown in FIGS. 6 and 7, the collector rotor includes conventional components typically found on a collector rotor such as a rotor shaft, bearings, fan and a coupling. The reference numbers for the conventional components are the same as the reference numbers used for the conventional collector shown in FIGS. 2 and 3. The coupling connects the collector to the rotor shaft of the generator and electrically connects the collector to the field windings on the rotor. The collector also includes the rotor mass 60 that is sized and positioned on the collector rotor shaft so the resultant characteristics of the new collector rotor at the generator interface coupling are equivalent to the brushless exciter.

Based on the exciter measurements, the volume and weight of the exciter rotor are determined in step 43. Knowing the exciter measurements, volume and its weight, the rotational mass moment of inertia relative to the shaft axial centerline is calculated in step 44. Similarly, the center of gravity of each of the sections of the exciter relative to the rotor coupling face is also determined in step 46. Knowing the center of gravity and weight of each section, the rotational mass moment of inertia is determined for each exciter section in step 48. The rotational mass moments of inertia are determined relative to the BE rotor coupling vertical face of the generator rotor coupling.

In step 50, the rotational mass moments of inertia of each section of the exciter rotor are summed to determine an overall rotational mass moment of inertia for the brushless exciter to be replaced. The overall moment of inertia, the rotational mass moments determined with respect to the coupling (see step 48) and other parameters that were determined with respect to the brushless exciter are documented in step 54 for current and future use. For example, once the measurements, masses and rotational moments of inertia a particular brushless exciter model has been documented documented it should not be necessary to re-measure when replacing another BE exciter of the same model. The documented information can be used to design a collector rotor which exhibits the same relative rotational mass moment Of inertia at the coupling the generator rotor as did the brushless exciter being replaced.

In step 56, the collector rotor 58 (FIG. 6) is designed to replace the brushless exciter that was measured in step 40. The collector rotor 58 is designed in a conventional manner except for the design of a mass moment of inertia matching rotor mass 60. This rotor mass 60 is added to the collector rotor so their combined rotational moment of inertia matches the rotational mass moment of inertia of the brushless exciter being replaced.

Based on the design of the collector rotor and before the rotor mass is added to the collector rotor design, the minimum collector rotor shaft configuration is determined for proper collector operation in step 62. The considerations for determining the minimum collector shaft center of gravity (MCR) configuration include sizing the collector standard components (slip rings, fans, coupling, etc.) for the generator field current and mechanical requirements. This identifies the minimum configuration for the collector for proper operation with the generator system. knowing the center of gravity (MCR) for each of the collector components, the minimum collector rotor shaft rotational mass moments of inertia and the rotational mass moments of inertia of the other components, e.g., bearings, fan, slip rings and coupling, of the collector rotor are determined in step 64.

The total mass and the total rotational mass moment of inertia for the minimum collector requirements is compared (step 66) to the mass and rotational mass moment of inertia of the brushless exciter (step 68) being replaced to determine the additional rotational mass moment of inertia needed to be added by the matching rotor mass 60 (step 70). Based on the additional mass and rotational mass moment of inertia needed, the matching rotor mass 60 is designed so as to provide the needed additional mass and rotational mass moment of inertia. In step 72, the rotational mass moments of inertia and mass of the matching rotor mass and the rest of the collector are compared to the mass and rotati mass moment of inertia of the brushless exciter. If there is no match, the design of the rotor mass 60 is further adjusted and the calculation (step 70) and comparison (step 72) are repeated until there is a match of the rotational mass moment of inertia with the collector and the rotational mass moment of inertia with the brushless exciter.

The design of the collector can be completed, once the rotational mass moment of inertia of the collector with rotor mass has been matched with the calculated rotational mass moment of inertia of the brushless exciter. The design and manufacture of the collector with rotor mass may be performed while the brushless exciter and its associated generator turbine assembly continue to operate and generate power. When the components for the collector have been manufactured and delivered to the site of the generator turbine assembly, the generator turbine assembly is taken off-line and the brushless exciter removed. The collector is assembled and installed on the generator turbine assembly in a conventional manner.

The calculated weight and center of gravity of the existing BE rotor (steps 42, 44, 46 and 48) can be confirmed by measuring the components of the brushless exciter after the BE rotor is disassembled. This information can be compared to the new matching collector rotor to supplement and validate the calculations.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method to replace a brushless exciter with a static excitation system for a generator comprising:
    a. measuring the brushless exciter to determine a weight and volume of the brushless exciter;
    b. determining a center of gravity for the brushless exciter based on the measured dimensions and determined weight;
    c. determining a rotational mass moment of inertia for the brushless exciter based on the determined center of gravity, weight and volume of the brushless exciter;
    d. forming a rotor mass to be included on the static excitation system, wherein the static excitation system with the rotor mass has a combined rotational mass moment of inertia matching the determined rotational mass moment of inertia of the brushless exciter;
    e. removing the brushless exciter from the generator, and
    f. attaching the static excitation system and the rotor mass to the generator.

2. The method of claim 1 wherein the static excitation system further comprises a collector.

3. The method of claim 1 wherein step (a) is performed while the brushless exciter is coupled to a generator of a turbine-generator assembly.

4. The method of claim 1 wherein the static excitation system is attached to a rotor assembly of the generator.

5. The method of claim 1 wherein forming the rotor mass includes mounting the rotor mass coaxially on a rotor of the static excitation system.

6. The method of claim 1 wherein forming the rotor mass further comprises:
    determining a difference between a rotational mass moment of inertia of the static excitation system and the determined rotational mass moment of inertia of the brushless exciter, forming the rotor mass to have a rotational mass moment of inertia substantially equal to the difference, configuring the rotor mass to be coaxially mounted on a rotating portion of the static excitation system, and comparing the combined rotational mass moment of inertia of the static excitation system with rotor mass to the determined rotational mass moment of inertia of the brushless exciter.

7. The method of claim 1 where forming the rotor mass further comprises: determining a difference between a rotational mass moment of inertia of the static excitation system to the determined rotational mass moment of inertia of the brushless exciter, forming the rotor mass to have a rotational mass moment of inertia substantially equal to the difference, and comparing the combined rotational mass moment of inertia of the static excitation system with rotor mass to the determined rotational mass moment of inertia of the brushless exciter.

8. The method of claim 1 wherein the generator is a turbine generator assembly capable of generating in excess of 100 MegaWatts of electrical power.

9. A method to replace a brushless exciter with a static excitation system for a generator comprising:
    a. measuring a plurality of dimensions of the brushless exciter to determine a volume of the exciter;
    b. determining a weight of the brushless exciter using the measured dimensions;
    c. determining a center of gravity for the brushless exciter based on the measured dimensions and determined weight;
    d. determining a rotational mass moment of inertia of the brushless exciter based on the center of gravity, determined weight and measured dimensions of the exciter;
    e. forming a rotor mass to be included with the static excitation system, wherein the static excitation system and the rotor mass have a combined rotational mass moment of inertia matching the determmined rotational mass moment of inertia of the brushless exciter, and
    f. matching the determined rotational mass moment of inertia of the brushless exciter to the combined rotational mass moment of inertia of the static excitation system and the rotor mass;
    g. replacing the brushless exciter with the static excitation system and the rotor mass.

10. The method of claim 9 wherein the static excitation system further comprises a collector.

11. The method of claim 9 wherein step (a) is performed while the brushless exciter is coupled to a generator of a turbine-generator assembly or disassembled from the generator.

12. The method of claim 9 wherein the static excitation system is attached to a rotor assembly of the generator.

* * * * *

UNITED STATES PATENT AND TRADEMARK OFFICE
CERTIFICATE OF CORRECTION

| | | |
|---|---|---|
| PATENT NO. | : 7,150,090 B2 | Page 1 of 1 |
| APPLICATION NO. | : 10/892229 | |
| DATED | : December 19, 2006 | |
| INVENTOR(S) | : David Dorsey et al. | |

It is certified that error appears in the above-identified patent and that said Letters Patent is hereby corrected as shown below:

In column 6 line 50 after the word "moment" delete the word "of"

In column 6 at line 50 the word "determmined" should read as --determined--

Signed and Sealed this

Fifteenth Day of May, 2007

JON W. DUDAS
*Director of the United States Patent and Trademark Office*